United States Patent [19]

Lusk

[11] 4,046,958

[45] Sept. 6, 1977

[54] CABLE TERMINATION CONNECTOR ASSEMBLY AND METHOD

[75] Inventor: George E. Lusk, Woodstock, Ill.

[73] Assignee: Joslyn Mfg. and Supply Co., Chicago, Ill.

[21] Appl. No.: 647,147

[22] Filed: Jan. 7, 1976

[51] Int. Cl.² .................. H02G 15/02; H01R 7/12
[52] U.S. Cl. ................. 174/73 R; 24/122.6;
24/135 N; 29/628; 174/75 D; 339/250;
339/272 R
[58] Field of Search ............ 174/19, 20, 73 R, 75 R,
174/75 D, 79, 80, 88 S, 90, 94 S, 74 R, 77 R;
339/242, 250, 272 R, 272 A; 24/122.3, 122.6,
135 N; 403/177, 362; 29/628, 461

[56] References Cited

U.S. PATENT DOCUMENTS

| 1,934,581 | 11/1933 | Bach | 339/272 A X |
|---|---|---|---|
| 1,943,660 | 1/1934 | Edwards | 339/242 |
| 3,166,810 | 1/1965 | Ensley | 403/177 |
| 3,399,270 | 8/1968 | Stoddard | 339/242 X |
| 3,725,851 | 4/1973 | Linn | 339/272 R X |
| 3,796,821 | 3/1974 | Lusk | 174/73 R |

FOREIGN PATENT DOCUMENTS

| 401,773 | 1/1943 | Italy | 339/242 |

Primary Examiner—Laramie E. Askin
Attorney, Agent, or Firm—Mason, Kolehmainen, Rathburn & Wyss

[57] ABSTRACT

A cable termination connector assembly for physically receiving and securely retaining the bared end of a current carrying center conductor of a high voltage power cable and for making an external electrical connection to the center conductor includes a multi-barrel connector for use with many different sizes of high voltage power cables. In a specific embodiment, four, elongated, axially extending apertures are formed in the connector for receiving the wire strands of a segmented or nonsegmented center conductor of a high voltage power cable. For smaller power cables, only one or two of the four apertures may be used; for larger power cables, three or four of the apertures may be used. A pair of oval point set screws associated with each of the apertures of the connector exert a high pressure to force the wire strands of the center conductor against the inner walls of the apertures to securely retain the wire strands within the connector and to break-up aluminum oxide coatings formed on the wire strands of aluminum center conductors. The connector assembly further includes a metallic cap plate that physically supports the multi-barrel connector and that provides an effective heat sink to maintain a uniform temperature throughout the duty cycle of the cable termination. The connector assembly also includes a connector housing that rests on the cap plate, that seals the connector and the interior of the cable termination and that supports a threaded connector stud for making an external electrical connection.

27 Claims, 7 Drawing Figures

CABLE TERMINATION CONNECTOR ASSEMBLY AND METHOD

BACKGROUND OF THE INVENTION

A. Field of the Invention

The device of the present invention relates generally to a new and improved high voltage cable termination and, more particularly, to a new and improved high voltage cable termination connector assembly for use with many sizes of the high voltage power cables.

B. Description of the Prior Art

Many high voltage power cables have been and are being manufactured with segmented or nonsegmented center conductors formed from aluminum wire strands rather than copper wire strands due to the availability of aluminum wire and its usually lower cost. The use of aluminum wire strands does, however, have its disadvantages. One major disadvantage is the rather rapid formation of aluminum oxide coatings on the outer surfaces of the aluminum wire strands and of associated aluminum connecting devices. Such coatings retard the flow of electrical current across an interface formed by the aluminum wire strands and a connecting device. In addition, aluminum wire strands experience relatively rapid metal fatigue due to hot and cold expansion and contraction cycles caused by changes in the ambient temperature and the operating temperature of the electrical system.

Many different types of connectors are used in the prior art to electrically connect the center conductor of a terminated high voltage power cable to an external electrical connector. U.S. Pat. No. 3,796,821 ('821 patent) illustrates one type of a prior art high voltage cable termination connector that has been used for smaller power cable sizes. The device illustrated in the '821 patent is not rapidly adaptable for use with power cables of widely varying sizes and wire gauges. Thus, different cable termination connectors of the type illustrated in the '821 patent must be available for use with substantially different sized power cables.

Another problem associated with the use of the above and other prior art cable termination connectors is the rather close tolerances that must be maintained in terminating the end of the power cable. If the center conductor of the power cable is cut too short or too long, a large amount of rework, resulting in a great loss of time and money, may be necessary in order to achieve an effective cable termination.

Several prior art cable termination connectors utilize a lower aluminum barrel connected by the application of compressive force or otherwise to the center conductor of a terminated power cable and an upper copper stud bonded to the lower aluminum barrel for making an external electrical connection to the center conductor. Often, the upper copper stud is accidentally separated from the lower aluminum barrel requiring the entire connection to the center conductor to be reworked, often a complicated, expensive and time consuming job.

Summary of the Invention

An object of the present invention is to provide a new and improved cable termination connector assembly.

Another object of the present invention is to provide a new and improved high voltage cable termination connector assembly suitable for use with many different sizes of high voltage power cables.

Another object of the present invention is to provide a new and improved multi-barrel connector for receiving and retaining the center conductors of various sizes of high voltage power cables.

Briefly, the present invention is directed to a new and improved cable termination connector assembly for use in receiving and securely retaining segmented or nonsegmented current carrying center conductors of many different sizes of high voltage power cables and for making external electrical connections to the center conductors. The cable termination connector assembly includes a multi-barrel connector that, in a specific embodiment, has four, elongated, axially extending apertures for receiving the wire strands of the center conductors of various sizes of high voltage power cables. For smaller power cables, only one or two of the four apertures may be used; for larger power cables, three of four of the apertures may be used. A pair of preferably oval point set screws associated with each of the apertures of the connector are used to apply high pressure to force the wire strands against the inner wall of each aperture both to secure the wire strands in each aperture and to break-up the aluminum oxide coating that may be present on the wire strands of an aluminum center conductor.

The connector is supported by a metallic cap plate that provides an effective heat sink to maintain a more uniform temperature throughout the duty cycle of the cable termination. A connector housing, physically distinct from the connector is also supported by the metallic cap plate and serves to hermetically seal the connector and the interior of the cable termination. The connector housing includes a threaded connector stud formed thereon for making an external electrical connection to the center conductor of a terminated power cable. The connector housing includes a vent valve to enable the interior of the cable termination to be filled with a dielectric fluid. Finally, the cable termination connector assembly includes a corona shield secured to the metallic cap plate and provided with an aperture through which the threaded connector stud extends for making an external electrical connection.

BRIEF DESCRIPTION OF THE DRAWING

The above and other objects and advantages and novel features of the present invention will become apparent from the following detailed description of the preferred embodiment of the invention illustrated in the accompanying drawing wherein.

DESCRIPTION OF THE PREFERRED EMBODIMENT

Figure 1:
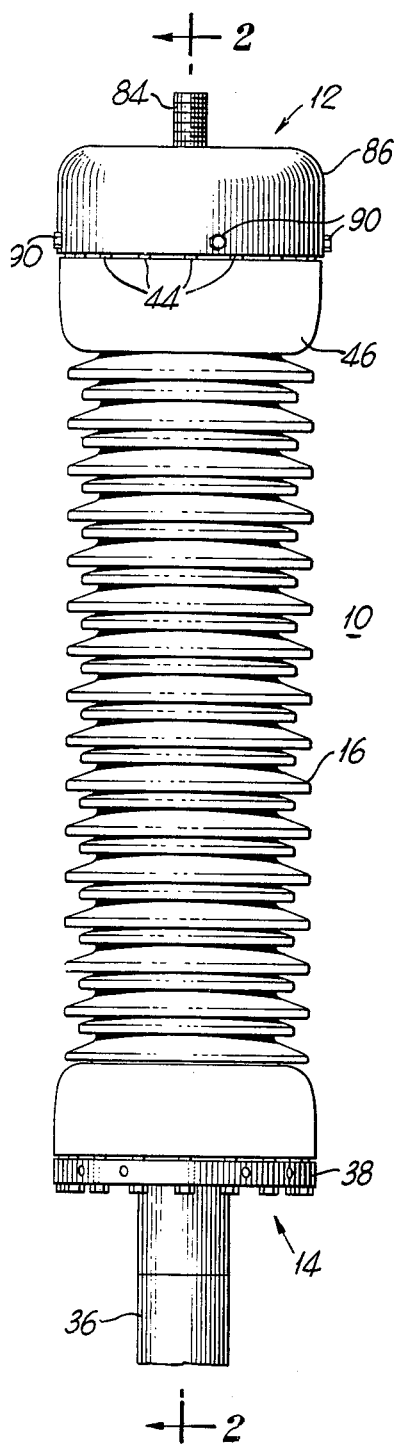
FIG. 1 is an elevational view of a high voltage cable termination that includes a cable termination connector assembly constructed in accordance with the principles of the present invention.
Figure 2:
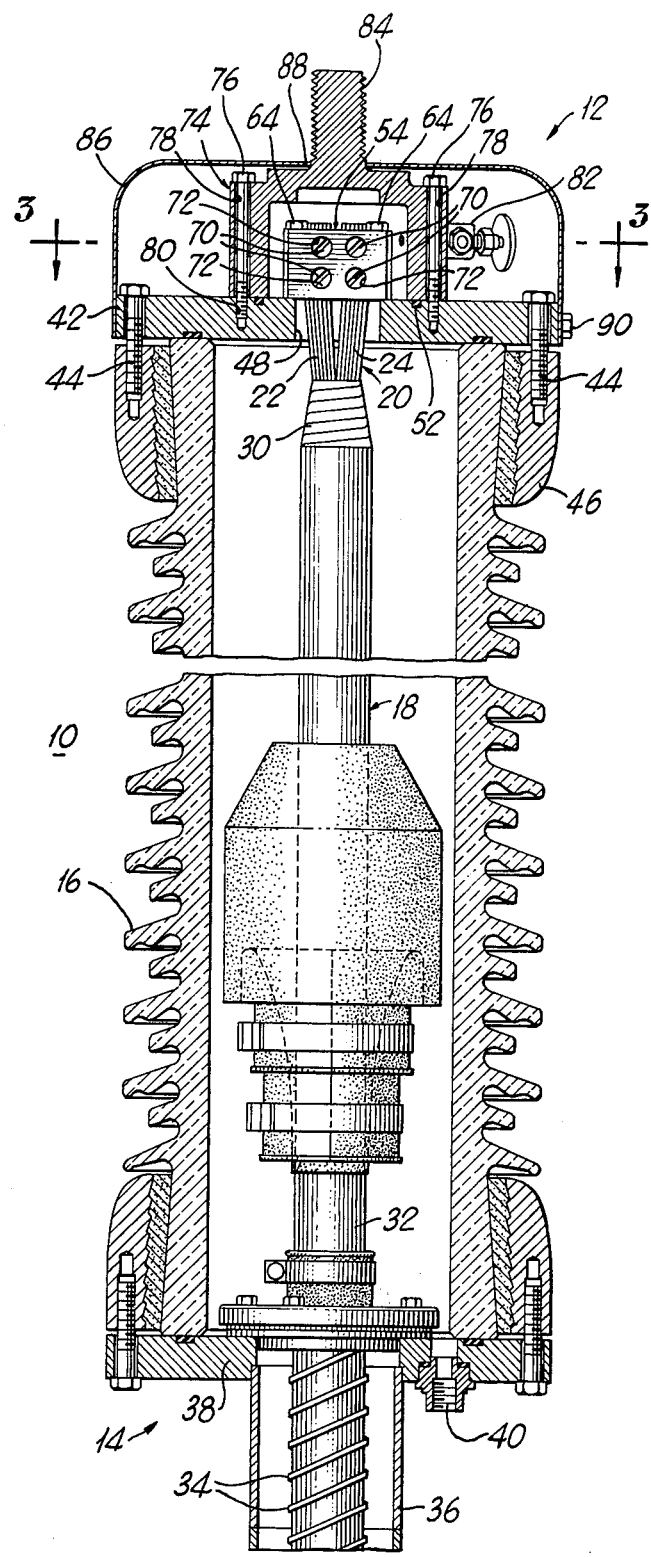
FIG. 2 is an enlarged, fragmentary, cross-sectional view of the cable termination of FIG. 1 taken along line 2—2 of FIG. 1.
Figure 3:
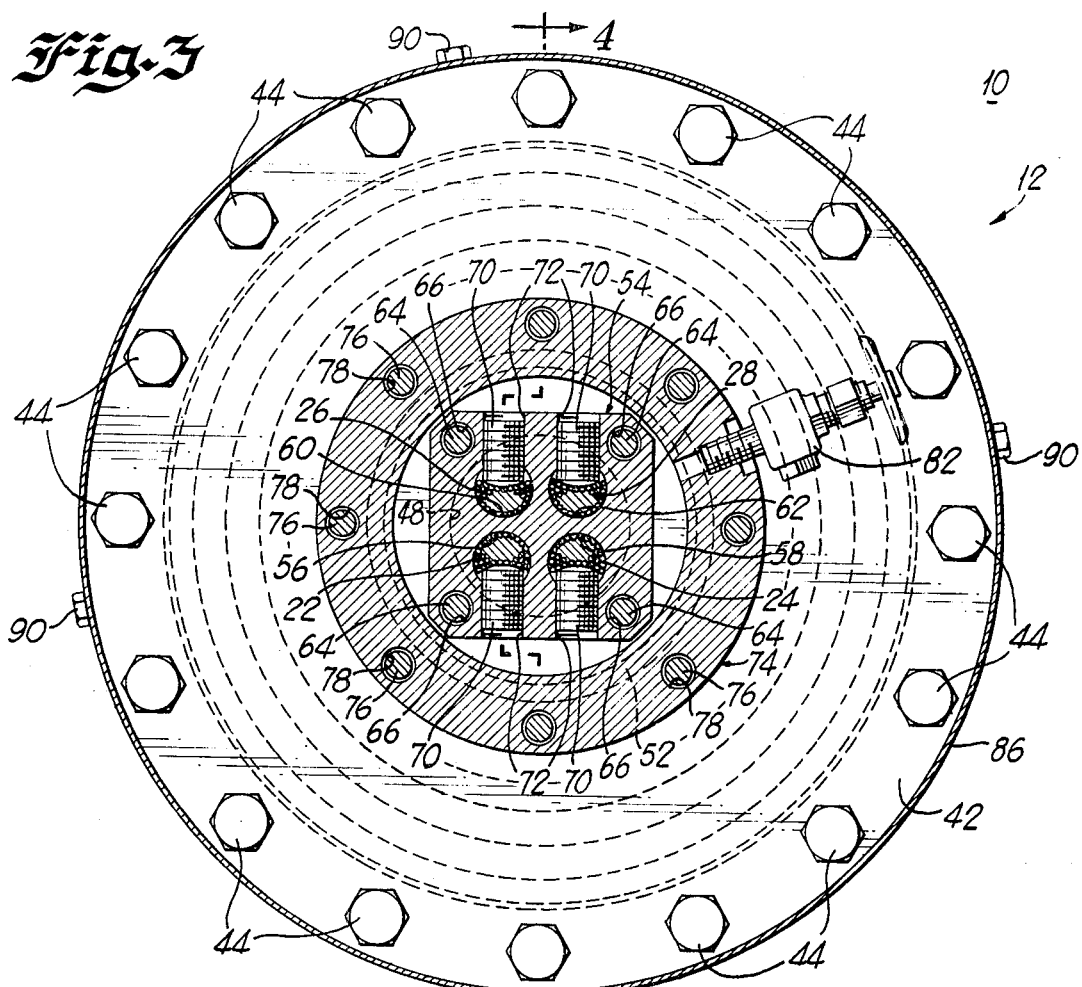
FIG. 3 is an enlarged, cross-sectional view of a portion of the cable termination of FIG. 1 taken along line 3—3 of FIG. 2.
Figure 4:
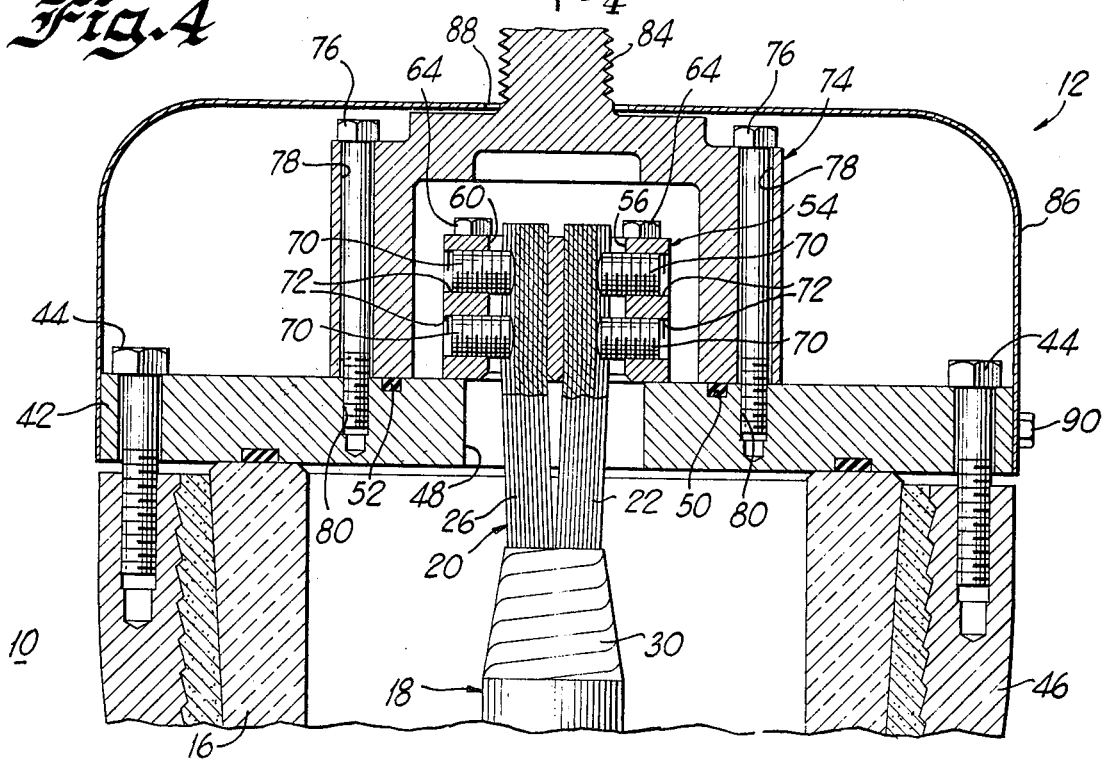
FIG. 4 is an enlarged, fragmentary, cross-sectional view of a portion of the cable termination of FIG. 1 taken along line 4—4 of FIG. 3.
Figure 6:
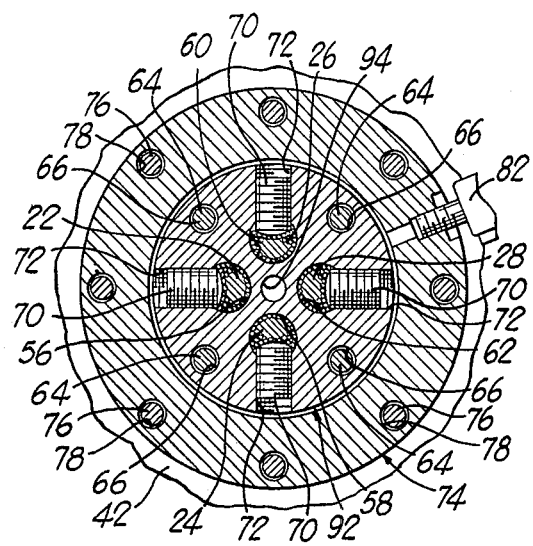
FIG. 6 is an enlarged, fragmentary, cross-sectional view of an alternate embodiment of a multi-barrel connector forming a portion of the cable termination connector assembly of the cable termination of FIG. 1.
Figure 7:
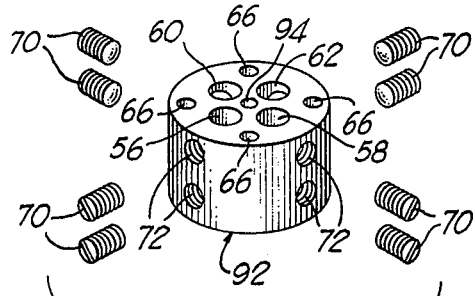
FIG. 7 is an enlarged, exploded, perspective view of the multi-barrel connector of FIG. 6.
Figure 5:
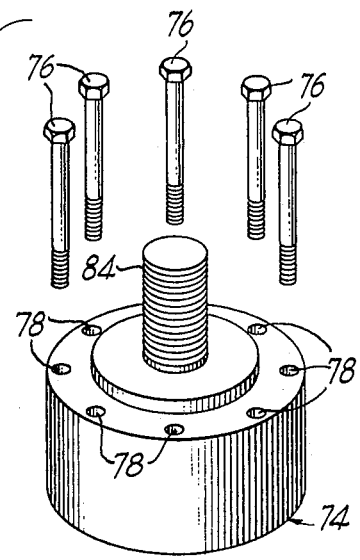
FIG. 5 is an enlarged, exploded, perspective view of a portion of the cable termination of FIG. 1 illustrating the manner in which a connector assembly is assembled in a cable termination in accordance with the principles of the present invention.
Figure 5:
Figure 5:
Figure 5:
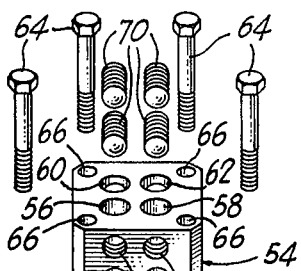
Figure 5:
Figure 5:
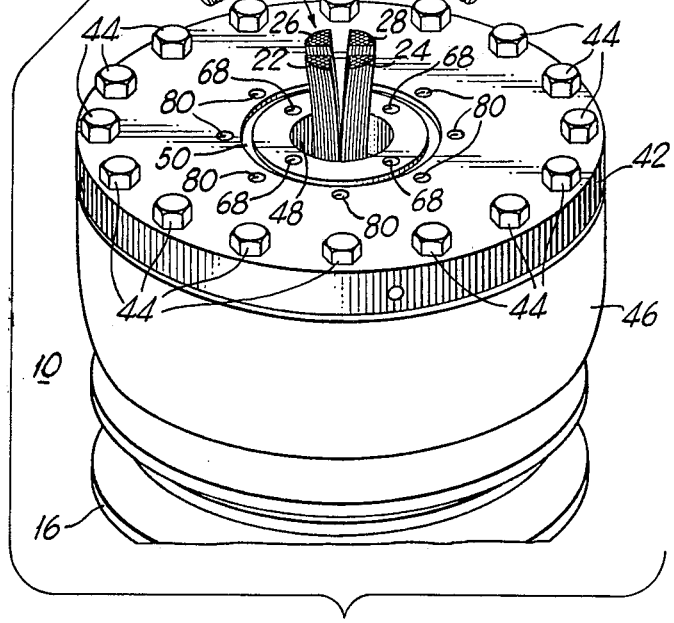

A high pressure oil filled cable termination 10 (FIGS. 1 and 2) includes a cable termination connector assembly 12, a base assembly 14 and a porcelain insulator 16 disposed therebetween. The cable termination 10 is used to terminate a high voltage power cable 18, for example, a 138KV power cable 18. The power cable 18 conventionally includes a segmented center conductor 20, having four center conductor segments 22, 24, 26 and 28 (FIG. 5), each formed by a plurality of individual wire strands. In a specific embodiment, the wire strands are aluminum wire strands. The power cable 18 further includes cable insulation 30 surrounding the center conductor 20 and an outer conductive cable sheath 32.

A plurality of conventional, conductive, metallic skid wires 34 are wound in a helical fashion about the cable sheath 32 to prevent damage to or destruction of the cable sheath 32 within a high pressure, oil filled riser pipe stub or pipe 36 of the high pressure, oil filled pipe system that connects with the cable termination 10 through the pipe 36. The pipe 36 may be secured, for example, by welding, to a metallic mounting plate 38 that is used to physically support the insulator 16 thereabove. An oil fill fitting 40 may be provided to fill the cable termination 10 with dielectric oil or to drain dielectric oil from the cable termination 10 through the mounting plate 38.

In accordance with an important feature of the present invention, the new and improved cable termination connector assembly 12 (FIGS. 2 through 5) is provided at the upper end of the insulator 16 for physically receiving and securely retaining the center conductor 20 and for making an external electrical connection to the center conductor 20 with an external electrical connector (not illustrated). The connector assembly 12 includes a metallic cap plate 42 formed, in the preferred embodiment, from tin plated aluminum and secured by a plurality of threaded fasteners 44 to a metallic cementing flange 46 cemented to the upper end of the insulator 16. The cap plate 42 includes an elongated, axially extending central aperture 48 through which the end of the center conductor 20 extends. The cap plate 42 further includes an annular recess 50 for receiving and retaining a sealing gasket 52.

The center conductor 20 is initially extended above the cap plate 42 by any convenient length. In accordance with an important feature of the present invention, a multi-barrel connector 54, formed in the preferred embodiment from tin plated aluminum, is provided to physically receive and retain the segments 22, 24, 26 and 28 of the center conductor 20. The connector 54 includes a plurality of four, elongated, axially extending, open-ended barrels or apertures 56, 58, 60 and 62 through which the segments 22, 24, 26 and 28 of the center conductor 20 are respectively extended. The connector 54 is secured in position on the cap plate 42 for effective electrical and thermal conductive contact therewith by a plurality of threaded fasteners 64 that extend through a plurality of apertures 66 in the connector 54 and are received and engaged by a plurality of threaded apertures 68 formed in the cap plate 42.

The wire strands forming the segments 22, 24, 26 and 28 are securely retained within each of the apertures 56, 58, 60 and 62, respectively, by a pair of preferably oval point set screws 70 received within and engaged by a pair of axially aligned, threaded apertures 72. The set screws 70 provide high pressure against the wire strands that form the segments 22, 24, 26 and 28 to force the wire strands against the axially extending inner walls of each of the apertures 56, 58, 60 and 62 to thereby securely retain the wire strands therein. In addition, the high pressure of the set screws 70 forcing the individual wire strands against the respective inner walls of the apertures 56, 58, 60 and 62 breaks up the aluminum oxide coatings that may be present on the wire strands when the center conductor 20 is formed by aluminum wire strands.

In a specific embodiment, the connector 54 is formed from a massive block of aluminum to thereby serve as an effective heat sink and electrical and thermal connector to the cap plate 42. For example, in a specific embodiment, the connector 54 may be formed from a block of aluminum having a substantially square cross-section measuring four inches per side and having a thickness or axial length of two and one-half inches. Each of the apertures 56, 58, 60 and 62 may be formed with a diameter of 1 1/16 inches.

A connector housing 74 is then positioned over the connector 54 and secured to the cap plate 42 by a plurality of threaded fasteners 76 that extend through a plurality of elongated, axially extending apertures 78 formed in the connector housing 74 and are received and engaged by a plurality of threaded apertures 80 formed in the cap plate 42. The connector housing 74 is formed, in the preferred embodiment, from tin plated aluminum and includes a vent valve 82 extending therethrough to enable the interior of the cable termination initially to be filled with oil. The connector housing 74 further includes a threaded connector stud 84 fixedly secured thereto. The connector housing 74 hermetically seals the interior of the cable termination 10 and the connector 54 from the atmosphere and electrically connects the center conductor 20 through a low resistance or short circuit current path through the connector 54, the cap plate 42, the connector housing 74 and the connector stud 84 to an external electrical connector (not illustrated).

A conductive corona shield 86 having a centrally disposed aperture 88 through which the connector stud 84 extends is installed over the connector housing 74 and secured in position by a plurality of threaded fasteners 90.

Should the connector stud 84 become damaged or separated from the connector housing 74, the cable termination 10 may be quickly and easily repaired merely be removing the corona shield 86 and removing and replacing the damaged connector housing 74. The relatively massive cap plate 42, the connector 54 and connector housing 74 provide an effective heat sink to dissipate both ambient heat and the heat generated during the operation of the cable termination 10, thereby reducing the severity of the hot and cold, expansion and contraction, cycles on the wire strands forming the center conductor 20.

For power cables smaller than the power cable 18, possibly only one, two or three of the four barrels or apertures 56, 58, 60 and 62 of the connector 54 may be utilized to receive and securely retain the center conductors of the smaller power cables. In this manner, an efficient, relatively simple and inexpensive cable termination connector assembly 12 is provided that reduces and in some cases eliminates many of the major disadvantages of prior art cable termination connector assemblies.

Obviously, many modifications and variations of the present invention are possible in light of the above teachings. For example, a multi-barrel connector 92 having a generally circular cross-section may be used in place of the connector 54 that is generally square in cross-section. The connector 92 includes even more mass to provide in many cases an even more effective heat sink and thermal and electrical conductive connector for operation in the cable termination connector assembly 12. Since, in a preferred embodiment, the outer diameter of the connector 92 is formed to be just slightly less than the inner diameter of the connector housing 74, an elongated axially extending central aperture 94 may be formed through the connector 92 to permit the flow of fluid, for example, dielectric oil, therethrough. In addition, the apertures 56, 58, 60 and 62 of the connectors 54 and 92 may be disposed in a non-parallel relationship with respect to the longitudinal axis of the power cable 18. Thus, it is to be understood that, within the scope of the appended claims, the invention may be practiced otherwise than as specifically described.

What is claimed and desired to be secured by Letters Patent of the United States is:

1. A connector assembly for a high voltage cable termination comprising
    means for receiving and securely retaining a plurality of wire strands of a current carrying center conductor of a high voltage power cable terminated by said cable termination, said receiving and retaining means comprising a unitary metallic member having a plurality of elongated apertures formed therein for selectively, respectively receiving a desired portion of said plurality of wire strands and
    means for physically supporting said receiving and retaining means in said cable termination, said supporting means comprising an annular, metallic plate and fastening means for securing said metallic plate in said cable termination.

2. A connector assembly as defined in claim 1 further comprising means for hermetically sealing said metallic member and the interior of said cable termination.

3. A connector assembly as defined in claim 2 wherein said sealing means comprises a generally cylindrical metallic housing supported by said metallic plate in a physically spaced-apart relationship to said metallic member.

4. A connector assembly as defined in claim 3 wherein said metallic plate includes an annular recess formed therein.

5. A connector assembly as defined in claim 4 wherein said sealing means further comprises an annular sealing gasket disposed in said annular recess.

6. A connector assembly as defined in claim 5 further comprising second fastening means for securing said metallic housing to said metallic plate such that the lowermost extremity of said metallic housing overlies said annular recess in said metallic plate and engages said annular sealing gasket to form a hermetic seal between said metallic plate and said metallic housing.

7. A connector assembly as defined in claim 6 wherein said metallic housing includes an elongated conductive means extending from an upper portion thereof for making an electrical connection between said current carrying center conductor of said high voltage power cable and an external electrical connector such that the electrical short circuit path for the electrical current flowing therebetween is a series electrical path from said center conductor, through said metallic member, through said metallic plate, through said metallic housing and through said elongated conductive means to said external electrical connector.

8. A connector assembly as defined in claim 7 further comprising a conductive corona shield having an aperture formed therein to permit said elongated conductive means to extend therethrough and configured to surround said metallic plate and at least a portion of said metallic housing.

9. A cable termination for terminating an end of a high voltage power cable of the type having a current carrying center conductor formed by a plurality of wire strands comprising
    an elongated dielectric housing for receiving the terminated portion of said power cable interiorly thereof,
    rigid means disposed at one longitudinal end of said dielectric housing for physically supporting said dielectric housing thereabove and
    a connector assembly disposed at the other longitudinal end of said dielectric housing for making an electrical connection between said center conductor of said terminated portion of said power cable and an external electrical connector, said connector assembly comprising
    means for receiving and securely retaining said plurality of wire strands of said center conductor, said receiving and retaining means including a unitary conductive member having a plurality of elongated, open-ended apertures formed therein for selectively, respectively receiving a desired portion of said plurality of wire strands, and
    means for physically supporting said receiving and retaining means in said cable termination, said supporting means comprising an annular metallic plate and fastening means for securing said metallic plate to said upper longitudinal end of said dielectric housing.

10. A cable termination as defined in claim 9 wherein said connector assembly further comprises means for hermetically sealing said metallic member and the interior of said dielectric housing.

11. A cable termination as defined in claim 10 wherein said sealing means comprises a generally cylindrical metallic housing supported by said metallic plate in a physically spaced-apart relationship to said metallic member.

12. A cable termination as defined in claim 11 wherein said metallic housing includes an elongated conductive means extending therefrom for making an electrical connection between said center conductor and said external electrical connector.

13. A cable termination as defined in claim 12 wherein said connector assembly further comprises fastening means for electrically, mechanically and thermally interconnecting said metallic member, said metallic plate and said metallic housing such that the electrical short circuit current path for the electrical current flowing between said center conductor and said external electrical connector is a series electrical path from said center conductor, through said metallic member, through said metallic plate, through said metallic housing and through said elongated conductive means to said external electrical connector.

14. A cable termination for terminating an elongated end portion of an insulated high voltage power cable of the type having a current carrying center conductor formed by a plurality of wire strands comprising
an elongated dielectric housing having an elongated bore for receiving said end portion of said power cable interiorly of said housing, the longitudinal axis of said bore being disposed substantially parallel to the longitudinal axis of said end portion,
rigid means disposed at one longitudinal end of said dielectric housing for physically supporting said dielectric housing thereabove and
an electrical conductive connector assembly disposed at the other longitudinal end of said dielectric housing for making an electrical connection between said center conductor of said end portion of said power cable and an external electrical connector, said electrical conductive connector assembly comprising means for receiving, electrically connecting and securely retaining said plurality of wire strands of said center conductor, said receiving, electrically connecting and retaining means including a unitary conductive member having a plurality of elongated apertures formed therein, each aperture adapted to receive a desired portion of said plurality of wire strands, said desired portion comprising more than one wire strand.

15. A cable termination as defined in claim 14 wherein said receiving, electrically connecting and retaining means further comprises at least one set screw associated with each one of said apertures for applying a compressive force to said wire strands to force said wire strands against the interior surface of said one aperture.

16. A cable termination as defined in claim 14 wherein said receiving, electrically connecting and retaining means includes at least a pair of spaced set screws associated with each one of said apertures for applying a compressive force to said wire strands to force said wire strands against the interior surface of said one aperture.

17. A cable termination as defined in claim 14 wherein said plurality of elongated apertures comprises a plurality of at least four, elongated, open-ended apertures.

18. A cable termination as defined in claim 14 wherein said connector assembly further comprises means for physically supporting said receiving and retaining means in said cable termination.

19. A cable termination for terminating an elongated end portion of an insulated high voltage power cable of the type having a segmented current carrying center conductor formed by segmented pluralities of wire strands comprising
an elongated dielectric housing having an elongated bore for receiving said end portion of said power cable interiorly of said housing, the longitudinal axis of said bore being disposed substantially parallel to the longitudinal axis of said end portion,
rigid means disposed at one longitudinal end of said dielectric housing for physically supporting said dielectric housing thereabove and
an electrical conductive connector assembly disposed at the other longitudinal end of said dielectric housing for making an electrical connection between said center conductor of said end portion of said power cable and an external electrical connector, said electrical conductive connector assembly comprising means for receiving, electrically connecting and securely retaining said segmented pluralities of wire strands of said center conductor, said receiving, electrically connecting and retaining means including a unitary conductive member having a plurality of elongated apertures formed therein, each aperture adapted to receive one segmented plurality of wire strands.

20. A cable termination as defined in claim 19 wherein said receiving, electrically connecting and retaining means further comprises at least one set screw associated with each one of said apertures for applying a compressive force to said segmented plurality of wire strands to force said wire strands against the interior surface of said one aperture.

21. A cable termination as defined in claim 19 wherein said receiving, electrically connecting and retaining means includes at least a pair of spaced set screws associated with each one of said apertures for applying a compressive force to said segmented plurality of wire strands to force said wire strands against the interior surface of said one aperture.

22. A cable termination as defined in claim 19 wherein said plurality of elongated apertures comprises a plurality of at least four, elongated, open-ended apertures.

23. A cable termination as defined in claim 19 wherein said connector assembly further comprises means for physically supporting said receiving and retaining means in said cable termination.

24. A method of terminating an elongated end portion of an insulated high voltage power cable of the type having a current carrying center conductor formed by a plurality of wire strands comprising the steps of
disposing said end portion of said power cable interiorly of an elongated dielectric housing having an elongated bore such that the longitudinal axis of said disposed end portion lies substantially parallel to the longitudinal axis of said bore,
dividing said plurality of said wire strands into a predetermined number of discrete portions, each of said discrete portions having more than one wire strand, and
disposing each one of said discrete portions in one aperture of a unitary conductive member having a plurality of elongated apertures formed therein for respectively receiving one of said discrete portions of said plurality of wire strands.

25. A method as defined in claim 24 further comprising the step of securely physically retaining each one of said discrete portions in its respective aperture to thereby form a mechanical and conductive electrical connection between said end portion and said conductive member.

26. A method of terminating an elongated end portion of an insulated high voltage power cable of the type having a segmented current carrying center conductor formed by segmented pluralities of wire strands comprising the steps of
disposing said end portion of said power cable interiorly of an elongated dielectric housing having an elongated bore such that the longitudinal axis of said disposed end portion lies substantially parallel to the longitudinal axis of said bore,
physically separating each segmented plurality of wire strands from the remaining one or ones of said segmented pluralities of wire strands, and disposing each one of said segmented pluralities of wire strands in one aperture of a unitary conductive member having a plurality of elongated apertures formed therein for respectively receiving one of said segmented pluralities of wire strands.

27. A method as defined in claim 26 further comprising the step of securely physically retaining each one of said segmented pluralities of wire strands in its respective aperture to thereby form a mechanical and conductive electrical connection between said end portion and said conductive member.

* * * * *